(12) United States Patent
Grigoryan et al.

(10) Patent No.: US 9,053,050 B2
(45) Date of Patent: Jun. 9, 2015

(54) DETERMINING A DESIRABLE NUMBER OF SEGMENTS FOR A MULTI-SEGMENT SINGLE ERROR CORRECTING CODING SCHEME

(75) Inventors: Hayk Grigoryan, Yerevan (AM);
Gurgen Harutyunyan, Yerevan (AM);
Samvel Shoukourian, Yerevan (AM);
Valery Vardanian, Yerevan (AM);
Yervant Zorian, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 844 days.

(21) Appl. No.: 13/310,479

(22) Filed: Dec. 2, 2011

(65) Prior Publication Data
US 2013/0145119 A1 Jun. 6, 2013

(51) Int. Cl.
*G06F 12/10* (2006.01)
*G06F 11/10* (2006.01)

(52) U.S. Cl.
CPC .................. *G06F 11/1048* (2013.01)

(58) Field of Classification Search
CPC .................................................. G06F 11/1048
USPC .................. 711/172, E12.068, E12.002, 203
See application file for complete search history.

(56) References Cited

U.S. PATENT DOCUMENTS 5,164,944 A * 11/1992 Benton et al. .................. 714/765
5,335,234 A * 8/1994 Matteson et al. .............. 714/767
6,233,717 B1 * 5/2001 Choi .............................. 714/805
6,408,416 B1 * 6/2002 Morley et al. .................. 714/763
7,721,181 B2 * 5/2010 Liao et al. ...................... 714/758
7,768,840 B1 * 8/2010 Aleksanyan et al. ..... 365/189.02
2009/0106716 A1 * 4/2009 Aleksanyan et al. .............. 716/5
2010/0146330 A1 * 6/2010 Dhong et al. ...................... 714/6
2013/0132799 A1 * 5/2013 Zhu et al. ........................ 714/768

OTHER PUBLICATIONS

Nalam, S.; Bhargava, M.; Ken Mai; Calhoun, B.H., "Virtual prototyper (ViPro): An early design space exploration and optimization tool for SRAM designers," Design Automation Conference (DAC), 2010 47th ACM/IEEE , vol., No., pp. 138,143, Jun. 13-18, 2010.*
Sanghyeon Baeg; ShiJie Wen; Wong, R., "SRAM Interleaving Distance Selection With a Soft Error Failure Model," Nuclear Science, IEEE Transactions on , vol. 56, No. 4, pp. 2111,2118, Aug. 2009.*
PCT International Search Report and Written Opinion, PCT Application No. PCT/US12/67433, Feb. 15, 2013, 14 pages.

* cited by examiner

*Primary Examiner* — Cheng-Yuan Tseng
*Assistant Examiner* — Ramon A Mercado
(74) *Attorney, Agent, or Firm* — Fenwick & West LLP

(57) ABSTRACT

A desirable number of segments for a multi-segment single error correcting (SEC) coding scheme is determined based on scrambling information for a memory. The desirable number of segments can be the minimum number of segments required to satisfy a masked write segmentation requirement and a multi-bit upset size requirement. In one aspect, the memory scrambling information can specify the different scrambling techniques employed by the memory (e.g., Input-Output (IO) cell scrambling, column scrambling, column twisting, strap distribution, etc.). Based on the scrambling information, a mapping between the logical structure and physical layout for the memory can be derived. The mapping can be used to determine the least number of segments needed to satisfy the masked write requirement and the multi-bit upset size requirement.

19 Claims, 16 Drawing Sheets

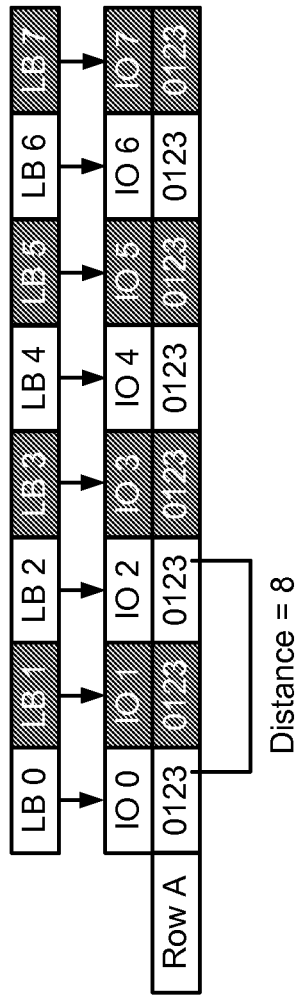
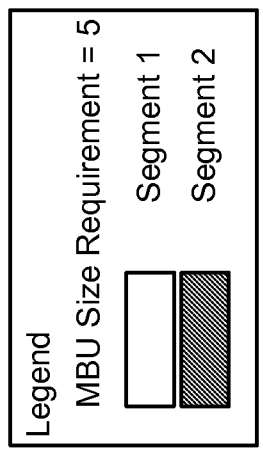
FIG. 11

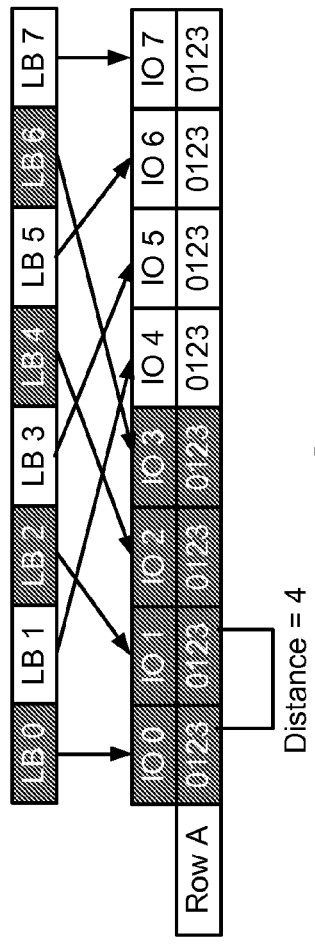
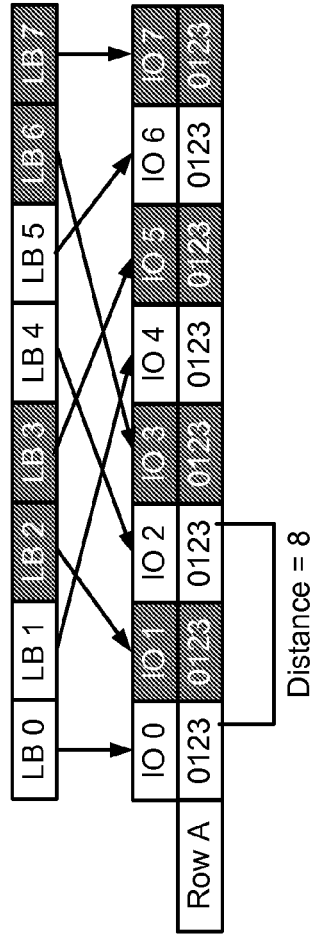

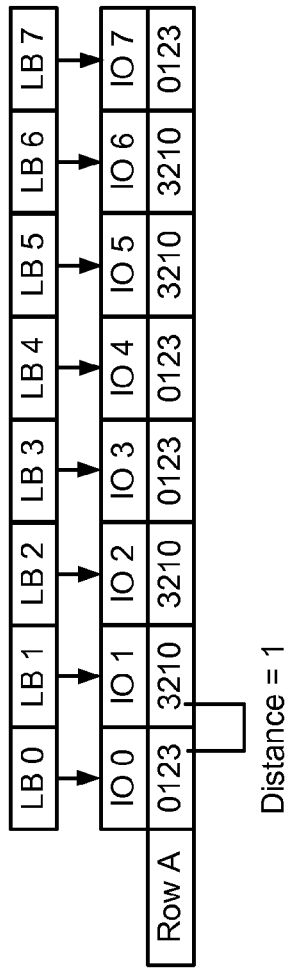
FIG. 13A
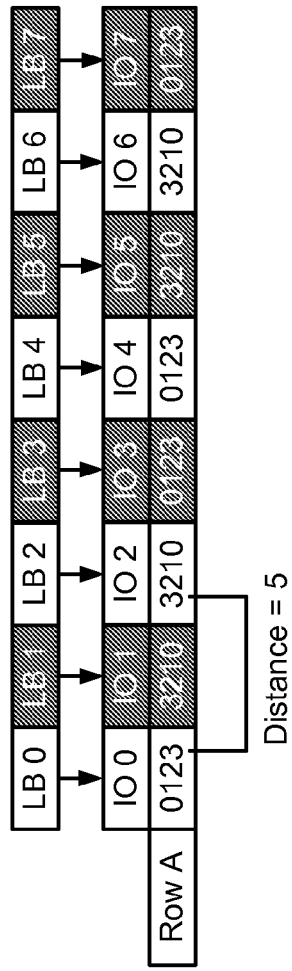
FIG. 13B
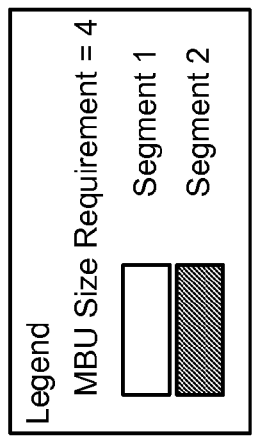

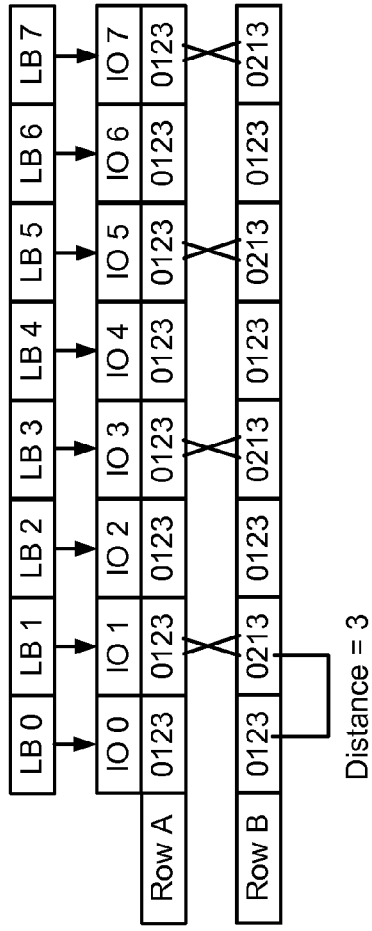
FIG. 14A
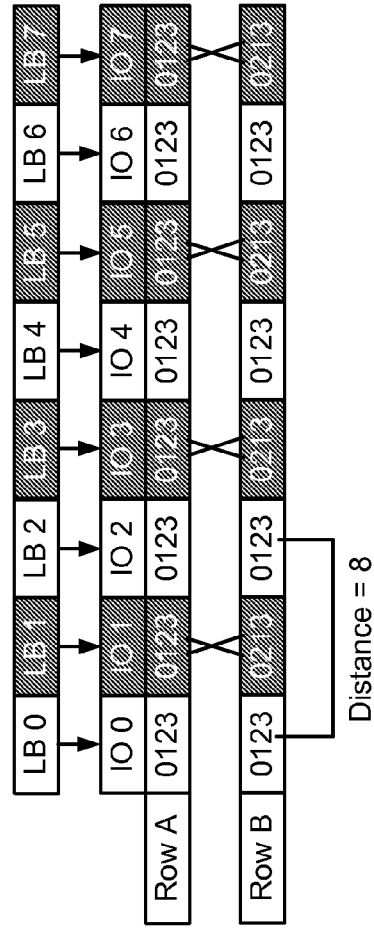
FIG. 14B
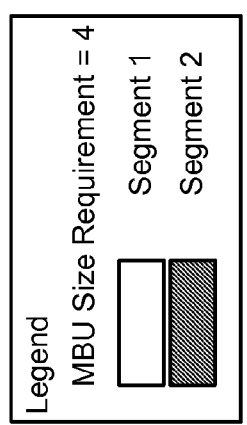

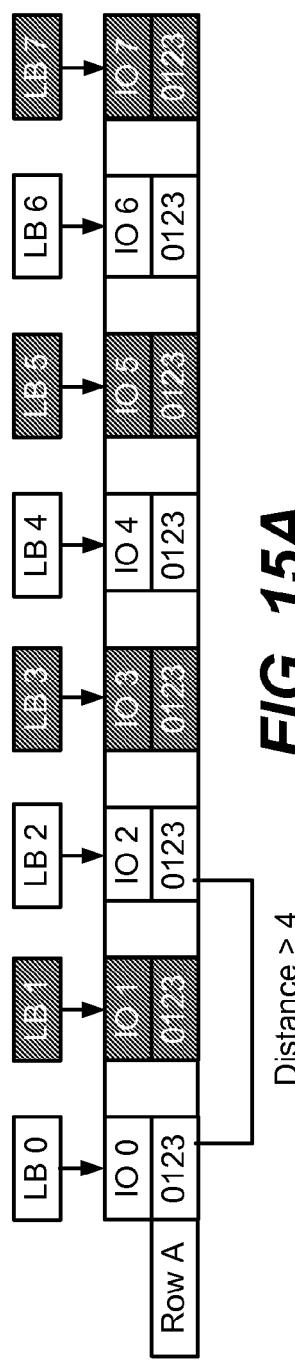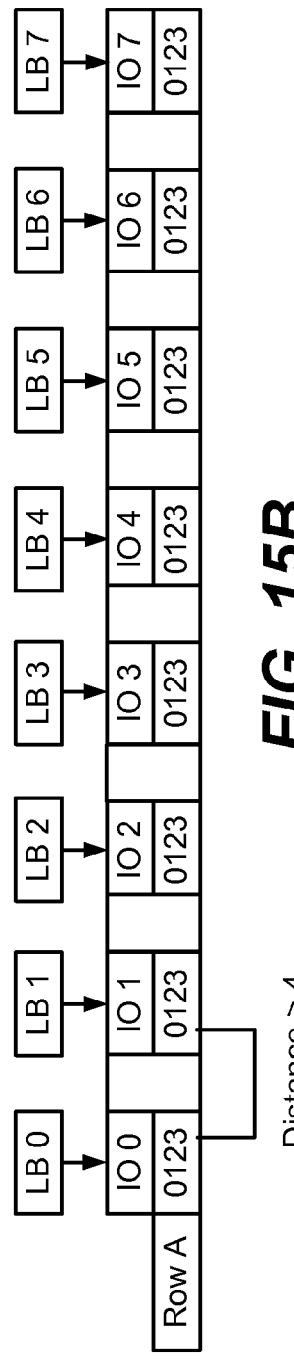

DETERMINING A DESIRABLE NUMBER OF SEGMENTS FOR A MULTI-SEGMENT SINGLE ERROR CORRECTING CODING SCHEME

BACKGROUND

1. Field of the Disclosure

The present disclosure relates to memory design, and more particularly to determining a desirable number of segments for a multi-segment single error correcting (SEC) coding scheme to be employed by a memory.

2. Description of the Related Art

Memory is often susceptible to various environmental phenomena that can affect the integrity of the data stored in the memory. For example, cosmic rays can cause the states of bits stored in the memory to change, which can lead to data corruption. Due to this issue, error detection and correction have become important features in memories currently in use.

Many error correction schemes employ single error correcting (SEC) codes. In such schemes, check bits are added to each of the data words (i.e., the basic data unit for a given computer architecture) stored in a memory. The added check bits can be used to facilitate the detection and correction of errors. In schemes that employ SEC codes, only single-bit errors are typically correctable. These same schemes are not normally able to handle multi-bit upsets. In general, a multi-bit upset refers to the corruption of a plurality of bits in a data word. For example, a data word may contain 32 bits. A multi-bit upset would occur if, for example, 3 of the 32 bits become corrupted. As used herein, the size of a multi-bit upset refers to the maximum distance between any 2 bits in a memory where a single environmental event (e.g., a cosmic ray) can lead to the corruption of both bits.

Because schemes employing SEC codes are able to only correct single-bit errors, many conventional memory design tools employ different techniques for minimizing the occurrence of uncorrectable multi-bit upsets. One technique involves dividing the data words of a memory into multiple segments, and providing each segment with its own check bits. In doing so, multi-bit upsets in a single word can be corrected (so long as the errors occur in different segments). As used herein, such a technique is referred to as a multi-segment single error correcting (SEC) coding scheme. In implementing multi-segment SEC coding schemes, conventional design tools do not account for certain aspects of a memory's structure. As such, conventional design tools are unable to effectively determine a desirable number of segments to be used in a multi-segment SEC coding scheme. As a result, memory performance, storage efficiency, and/or error correction can be adversely impacted.

SUMMARY

Embodiments relate to the determination of a desirable number of segments for a multi-segment single error correcting (SEC) coding scheme to be used in a memory, where determination of the desirable number of segments is based on memory scrambling information. In one aspect, the memory scrambling information can specify the different scrambling techniques implemented in the memory. The memory scrambling information can additionally specify the parameters, structures, and/or other data needed to implement the scrambling techniques.

In one embodiment, the desirable number of segments can be the minimum number of segments required to satisfy a masked write segmentation requirement and a specified multi-bit upset size requirement. The masked write segmentation requirement can indicate the minimum number of segments in which a data word of the memory must be divided. The multi-bit upset size requirement can indicate a minimum distance that must separate any 2 bits of the same data word segment.

In one implementation, a mapping between the logical structure and physical layout of a memory can be determined using memory scrambling information. Based on the mapping, a number of distances for a number of different logical pairs of bits of the memory can be calculated. After determining the distances, a specific segmentation value can be selected, where the segmentation value is greater than a defined masked write segmentation value. As used herein, a segmentation value can refer to a number of segments in which each data word of a memory is to be divided for a multi-segment SEC coding scheme.

In one embodiment, the selected segmentation value can be tested to determine whether the value satisfies a defined multi-bit upset size. In particular, each data word of the memory is divided into a number of segments equal to the segmentation value. Thereafter, the minimum or shortest distance between any two logical pairs of bits of the same segment in the memory is determined by referencing the previously determined number of distances. If the minimum distance between any two pairs of bits of the same segment is greater than or equal to the defined multi-bit upset size requirement, the selected segmentation value can be chosen for the multi-segment SEC coding scheme. If the minimum distance between any two pairs of bits of the same segment is less than the defined multi-bit upset size requirement, a new segmentation value is selected and tested in the same manner.

In one embodiment, the chosen segmentation value can be the smallest segmentation value that satisfies the multi-bit upset size requirement.

BRIEF DESCRIPTION OF THE DRAWINGS

The teachings of the embodiments can be readily understood by considering the following detailed description in conjunction with the accompanying drawings.

FIG. 11 illustrates a segmentation of memory array where memory scrambling has not been implemented, according to one embodiment.

FIGS. 12A and 12B each illustrates a segmentation of a memory array where IO cell scrambling has been implemented, according to one embodiment.

FIGS. 13A and 13B each illustrates a segmentation of a memory array where column scrambling has been implemented, according to one embodiment.

FIGS. 14A and 14B each illustrates a segmentation of a memory array where column twisting has been implemented, according to one embodiment.

FIGS. 15A and 15B each illustrates a segmentation of a memory array where a strap distribution is included in the array, according to one embodiment.

DETAILED DESCRIPTION OF EMBODIMENTS

Figure 1:
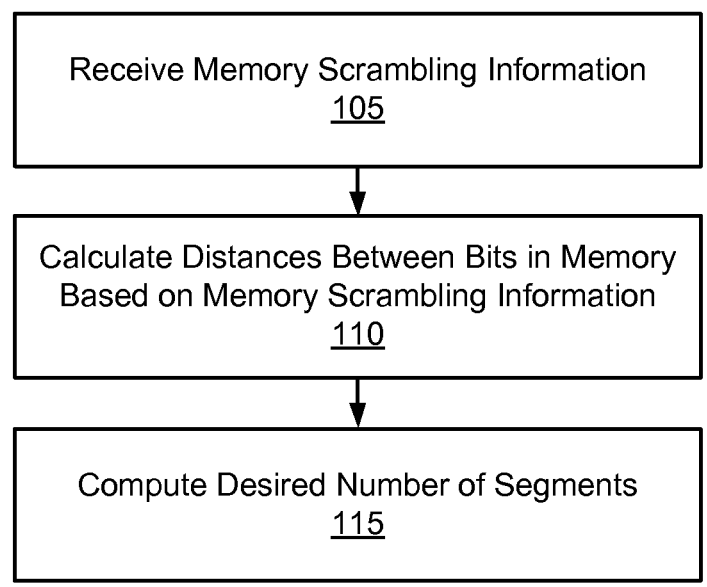
FIG. 1 is a flowchart illustrating a method for determining a desirable number of segments for a multi-segment SEC coding scheme using memory scrambling information, according to one embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Embodiments of the present disclosure relate to the determination of a desirable number of segments to be used in a multi-segment single error correcting (SEC) coding scheme for a memory, where such a determination is based on memory scrambling information. In particular, embodiments can use the memory scrambling information to accurately determine the physical locations of the bits of a memory. In doing so, embodiments can compute a number of segments that enables the effective operation of a multi-segment SEC coding scheme for a memory.

In one embodiment, the desirable number of segments can be the minimum number of segments required to satisfy a masked write segmentation requirement and a specified multi-bit upset size requirement. The masked write segmentation requirement can indicate the minimum number of segments in which each data word of a memory must be divided. The multi-bit upset size requirement can indicate a minimum distance that must physically separate any 2 bits of an individual segment in a multi-segment SEC coding scheme.

As discussed previously, a multi-segment SEC coding scheme divides the bits of a data word into multiple segments, where each segment includes its own check bits. For example, a data word comprising of 8 bits may be divided into 2 segments with each segment containing 4 bits of the original data word. Each of the 2 segments contains its own check bits. In this way, the multi-segmented SEC coding scheme enables a memory to recover from a multi-bit upset, where the multi-bit upset corrupts a single bit in different segments.

In order to ensure that multi-bit upsets do not cause the corruption of multiple bits of the same segment (which is uncorrectable), embodiments physically separate the bits of each segment by a multi-bit upset size. In doing so, embodiments can make it less likely that a single environmental event causes an uncorrectable multi-bit upset (i.e., the corruption of two bits within the same segment). In general, as the number of segments for a multi-segment SEC coding scheme increases, the further apart any two bits of the same segment are spaced. As a result, increasing the number of segments tends decrease the probability that an uncorrectable multi-bit upset occurs. However, increasing the number of segments also adversely impacts memory performance and storage efficiency. As such, the number of segments required for a multi-segment SEC coding scheme must be carefully selected to balance error correction with memory performance and storage efficiency.

In order to select such a number, memory scrambling information for a memory can be considered. As used herein, memory scrambling can refer collectively to the various techniques implemented in a memory that impacts the correspondence between the memory's logical structure and topological or physical layout. For example, a memory may logically or externally represent that the bits of a stored data word are adjacent to one another. However, because of memory scrambling, the bits may in fact be physically stored in non-adjacent cells within the memory.

As also used herein, memory scrambling information can refer to a collection of data that specifies the various scrambling techniques implemented in a memory. In one embodiment, such memory scrambling information can include the parameters, structures, layouts, and/or other data needed to implement specific types of scrambling in a memory. Examples of the different types of memory scrambling that may be considered by embodiments are described below.

Conventional memory design tools do not consider memory scrambling information when implementing a multi-segment SEC coding scheme for a memory. As a result, such tools are unable to accurately determine the distances between the bits of the memory, which can lead to the poor selection of a number of segments for the multi-segment SEC coding scheme. In contrast, embodiments, by accounting for memory scrambling, can accurately determine the storage locations for the bits of a memory and also the distances physically separating such bits. In doing so, embodiments can select a number of segments that enables the memory to effectively implement a multi-segment SEC coding scheme such that the memory is able to operate at high levels of performance, storage efficiency, and error correction.

FIG. 1 illustrates a process for determining a desirable number of segments for a multi-segment SEC coding scheme, where the determination is based at least in part on memory scrambling information. The process shown in FIG. 1 can be performed during the design and fabrication of a memory. It should be appreciated that determination of a desirable number of segments for a multi-segment SEC coding scheme as described herein can be performed on a data representation of a memory to be fabricated. More specifically, the data representation may be a collection of specifications, layouts, functionality information, and/or other data usable for the design of the memory to be fabricated. For ease of understanding and clarity, however, the data representation will be referred to herein as the memory.

In FIG. 1, the process begins by receiving 105 memory scrambling information. In one embodiment, the memory scrambling information may include information regarding the various memory scrambling techniques to be incorporated in a memory, such as IO cell scrambling, column scrambling, column twisting, and various strap distributions. The memory scrambling information can additionally specify the parameters, structures, functionalities, and/or other data needed to implement the scrambling techniques. In one aspect, the information may be sufficient to derive a mapping between the logical structure and physical layout of the memory, where the mapping accounts for the memory scrambling techniques used in the memory.

Based on the mapping, the process calculates 110 the physical distances between pairs of bits within a particular data word of the memory. More specifically, the logical location of each bit stored in the memory can be mapped to a physical location of the memory using the mapping. Based on the determined physical locations, the process calculates the physical distances separating each logically adjacent pair of bits of each data word. For example, a data word may include a first bit stored at logical location 0 of a memory and a second bit stored at logical location 1. The two bits can be considered a logically adjacent pair. The first bit of the pair may be physically stored in a cell located in the first column and first row of the memory. The second bit of the pair may be physically stored in a cell located in the third column and first row of the memory. As a result, the distance between the 2 logically adjacent bits may be calculated to be 2 cells. In one embodiment, the calculated distances can be stored in a suitable data structure, such as a table, etc.

Figure 2:
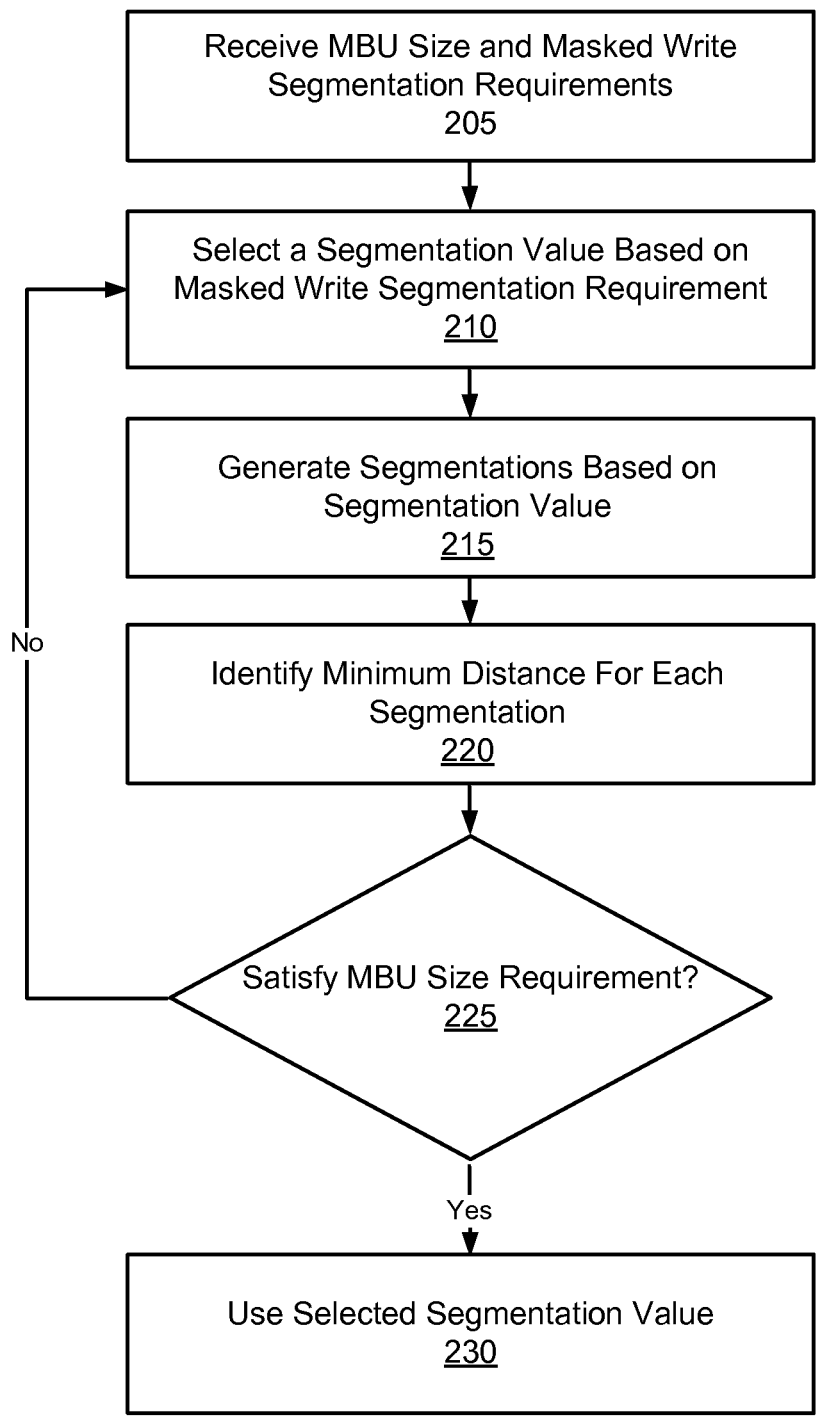
FIG. 2 is a flowchart illustrating a method for computing a desirable number of segments for a multi-segment SEC coding scheme, according to one embodiment.

Based on the calculated distances, the process determines 115 a desirable number of segments to use in a multi-segment SEC coding scheme for the memory. As discussed, the desirable number of segments can enable a memory to effectively employ the multi-segment SEC coding scheme. FIG. 2 illustrates an example process for computing a desirable number of segments. In FIG. 2, the process receives 205 a multi-bit upset size requirement and a masked write segmentation requirement. The requirements can be received from, for example, a designer of the memory. Upon receiving the requirements, the process selects 210 a segmentation value. The selected segmentation value can specify the number of times each data word stored in the memory is to be segmented. For example, a segmentation value of 3 would indicate that each data word is to be divided into 3 segments. In one aspect, the selected segmentation value is greater than or equal to the received masked write segmentation requirement.

Upon selecting a segmentation value, the process generates 215 a number of different segmentations for the memory. As used herein, a segmentation can refer to a distribution of the bits of a memory to a number of segments. Each segmentation can divide the data words stored of the memory into a number of segments that is equal to the selected segmentation value. However, each segmentation may distribute the bits among the segments in a different manner. For example, a first segmentation may place the first and second bits of a data word into the same segment. A second segmentation, in contrast, may place the first and third bits of a data word into the same segment.

For each segmentation, the process identifies 220 a minimum or shortest distance separating the bits of the same data word segment. In particular, the process determines, for each pair of logically adjacent bits of the same segment in the memory, the physical distance between the 2 bits. Such a distance can be determined by performing a lookup in the previously generated table storing the physical distances between the bits of the memory. Upon determining the distances between each pair of bits of the same segment, the process identifies the minimum or shortest distance among the determined distances.

For each segmentation, the process determines 225 whether the determined minimum distance is greater than or equal to the multi-bit upset size. If the minimum distance for each segmentation is less than the multi-bit upset size, the process returns to step 210, and selects a new segmentation value. The newly selected segmentation value may be 1 greater than the previously selected segmentation value. If the minimum distance for at least one of the segmentations is greater than or equal to the multi-bit upset size requirement, then the process uses 230 the segmentation value as the number of segments to be used for the multi-segment SEC coding scheme for the memory.

It should be appreciated that other embodiments can perform one or more steps of FIGS. 1 and 2 in parallel or in a different sequence. Moreover, other embodiments can include additional, fewer, and/or different steps than the ones described herein. For example, in one embodiment, the process shown in FIG. 2 may not receive masked write segmentation requirement. Rather, determination of the desirable number of segments for the multi-segment SEC coding scheme can be based on the multi-bit upset size requirement.

Computing Machine Architecture

Figure 3:
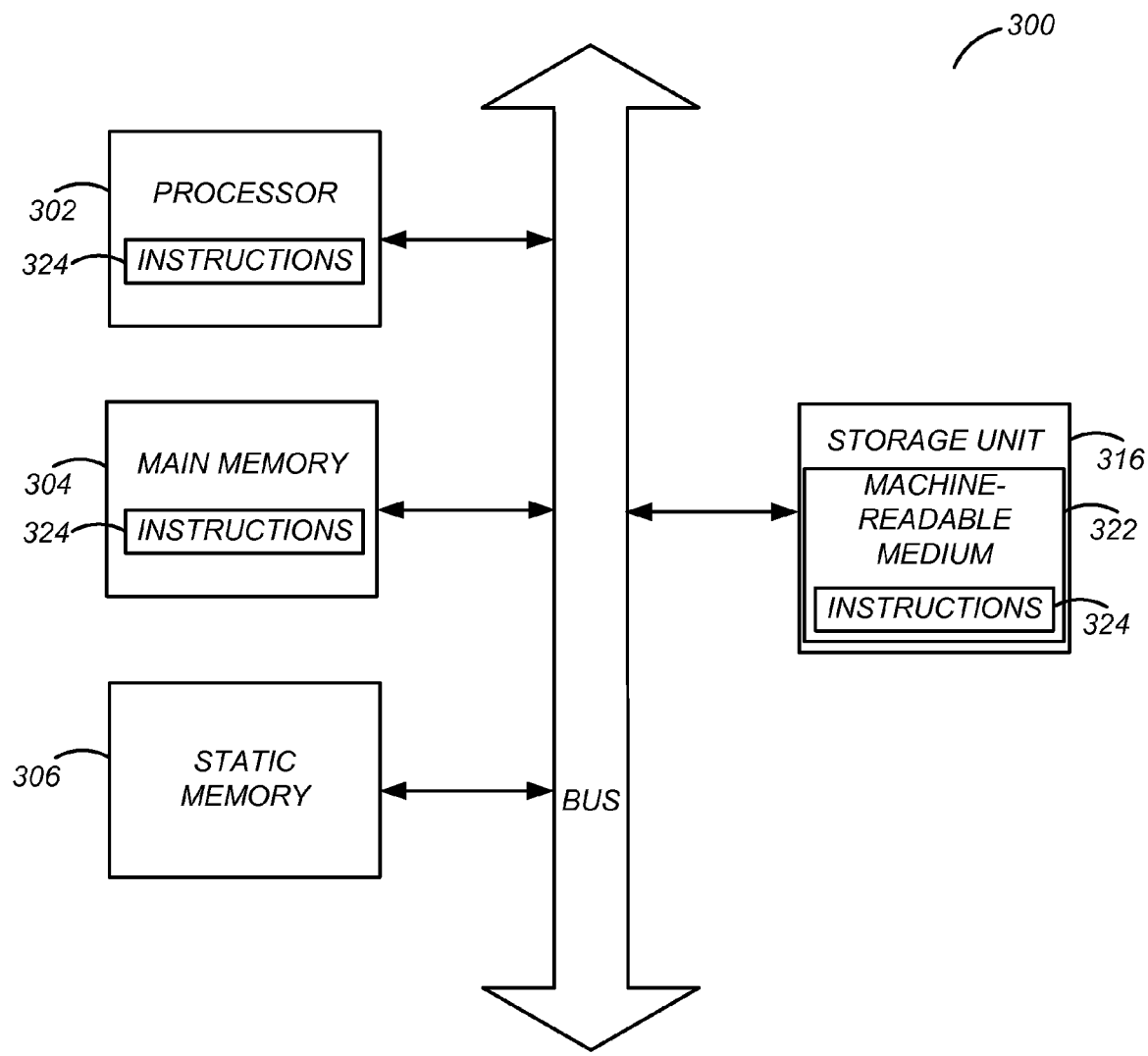
FIG. 3 is a block diagram illustrating various components of an example machine able to read instructions from a machine-readable medium and execute the instructions in a processor (or controller), according to one embodiment.

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which instructions 324 (e.g., software) for causing the machine to perform any one or more of the methodologies and processes discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. The processes embodied as instructions can be, for example, the processes described in FIGS. 1, 2 and elsewhere herein.

The machine may be a server computer, a client computer, a personal computer (PC), or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein. For example, a machine may be configured to execute instructions for performing the processes shown in FIGS. 1 and 2. For instance, the machine may be configured to execute instructions for calculating the distances between the bits of each data word in a memory, where the calculating is based on memory scrambling information. The machine may additionally be configured to execute instructions for computing a desirable number of segments for a multi-segment SEC coding scheme.

The example computer system 300 includes a processor 302 (e.g., a central processing unit (CPU), a graphics processing unit (GPU), a digital signal processor (DSP), one or more application specific integrated circuits (ASICs), a main memory 304, a static memory 306, and a storage unit 316 which are configured to communicate with each other via a bus 308. The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. For example, a machine-readable medium may be capable of storing instructions for execution by the machine and that cause the machine to perform the processes shown in FIGS. 1 and 2. For instance, the machine-readable medium may store instructions that cause the machine to calculate the distances between the bits of each data word in a memory, where the calculation is based on memory scrambling information. The instructions may additionally cause the machine to compute a desirable number of segments for a multi-segment SEC coding scheme. The term "machine-readable medium" includes, but not be limited to, data repositories in the form of solid-state memories, optical media, and magnetic media.

Overview of EDA Design Flow

Figure 4:
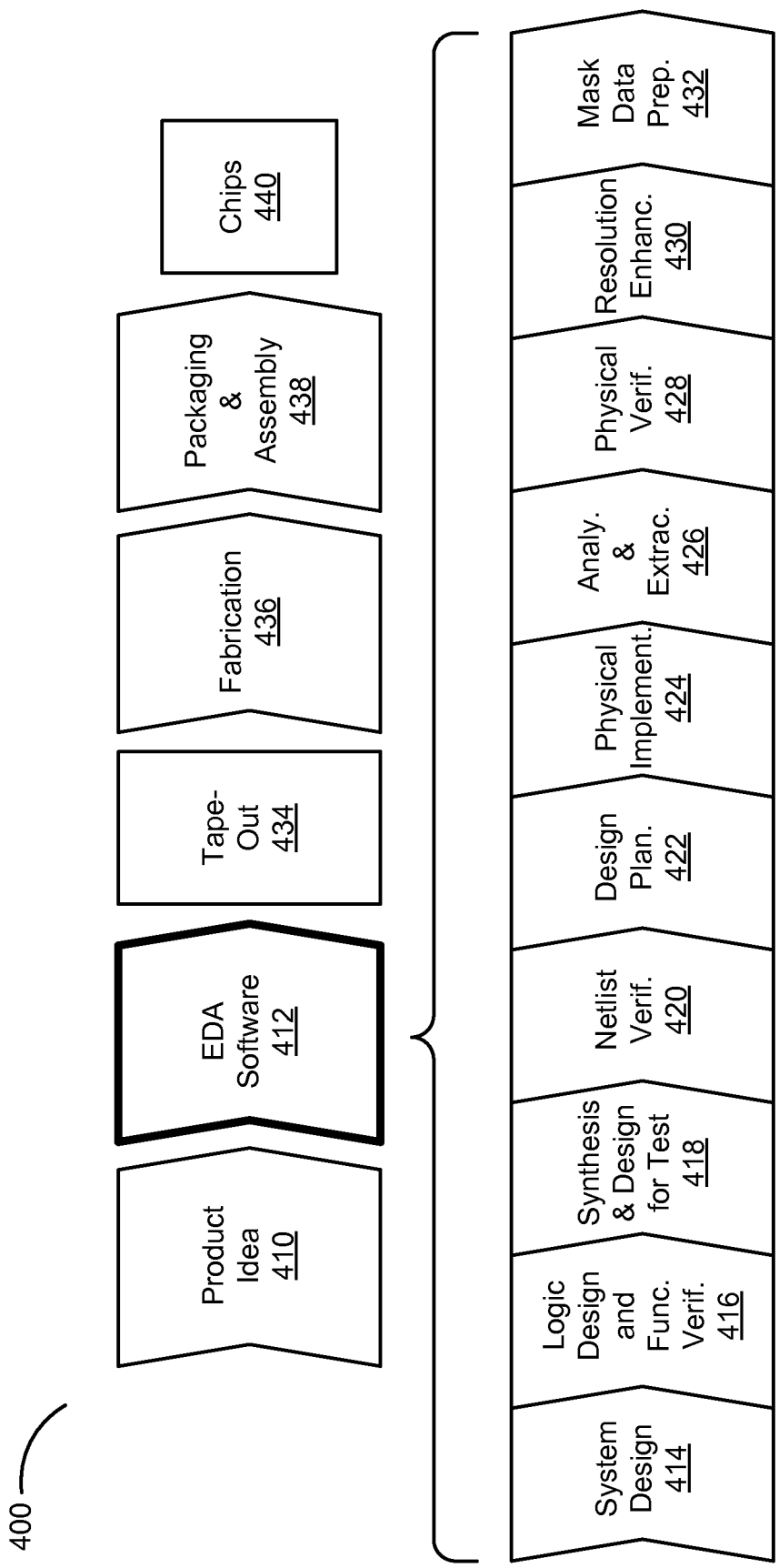
FIG. 4 is a flowchart illustrating various operations in the design and fabrication of a memory, according to one embodiment.

FIG. 4 is a flowchart 400 illustrating a process for designing and fabricating a memory. The memory designed and fabricated via the process shown in FIG. 4 can include a memory array, and generally can be used as the memory for a computing device (e.g., a desktop computer, a laptop computer, a mobile phone, a tablet device, etc.). The process starts with the generation of a product idea 410, which is realized during a design process that uses electronic design automation (EDA) software 412. When the design is finalized, it can be taped-out 434. After tape-out, a semiconductor die is fabricated 436 to form the various objects (e.g., gates, metal layers, vias) in the memory design. Packaging and assembly processes 438 are performed, which result in finished chips 440.

The EDA software 412 may be implemented in one or more computing devices such as the computer 300 of FIG. 3. For example, the EDA software 412 is stored as instructions in the computer-readable medium which are executed by a processor for performing operations 414-432 of the design flow, which are described below. This design flow description is for illustration purposes. In particular, this description is not meant to limit the present disclosure. For example, an actual memory design may require a designer to perform the design operations in a different sequence than the sequence described herein.

During system design 414, a memory designer describes the functionality and/or structures to be implemented in a memory. For example, the designer can define the manner in which a memory is to be scrambled. Illustratively, the designer can specify the types of memory scrambling techniques to be implemented in the memory. For instance, the designer can specify that the memory is to incorporate Input-Output (IO) cell scrambling. The designer can additionally define the parameters, structures, and/or other data for the IO cell scrambling. In one embodiment, the designer can further specify that the memory is to implement a multi-segment SEC coding scheme in order to detect and correct from errors. In such an embodiment, the designer can provide a masked write operation segmentation requirement and a multi-bit upset size requirement for the scheme. In one embodiment, a desirable number of segments for a multi-segment SEC coding scheme can be determined based on the memory scrambling information previously defined by the memory designer. Example EDA software products from Synopsys, Inc. of Mountain View, Calif. that can be used at this stage include: Model Architect®, Saber®, System Studio®, and Designware® products.

During logic design and functional verification 416, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 418, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 420, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 422, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 424, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 426, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 428, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 430, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 432, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, in some embodiments the present disclosure can be used in EDA software 412 that includes operations between system design 414 and logic design and functionality verification 416.

Figure 5:
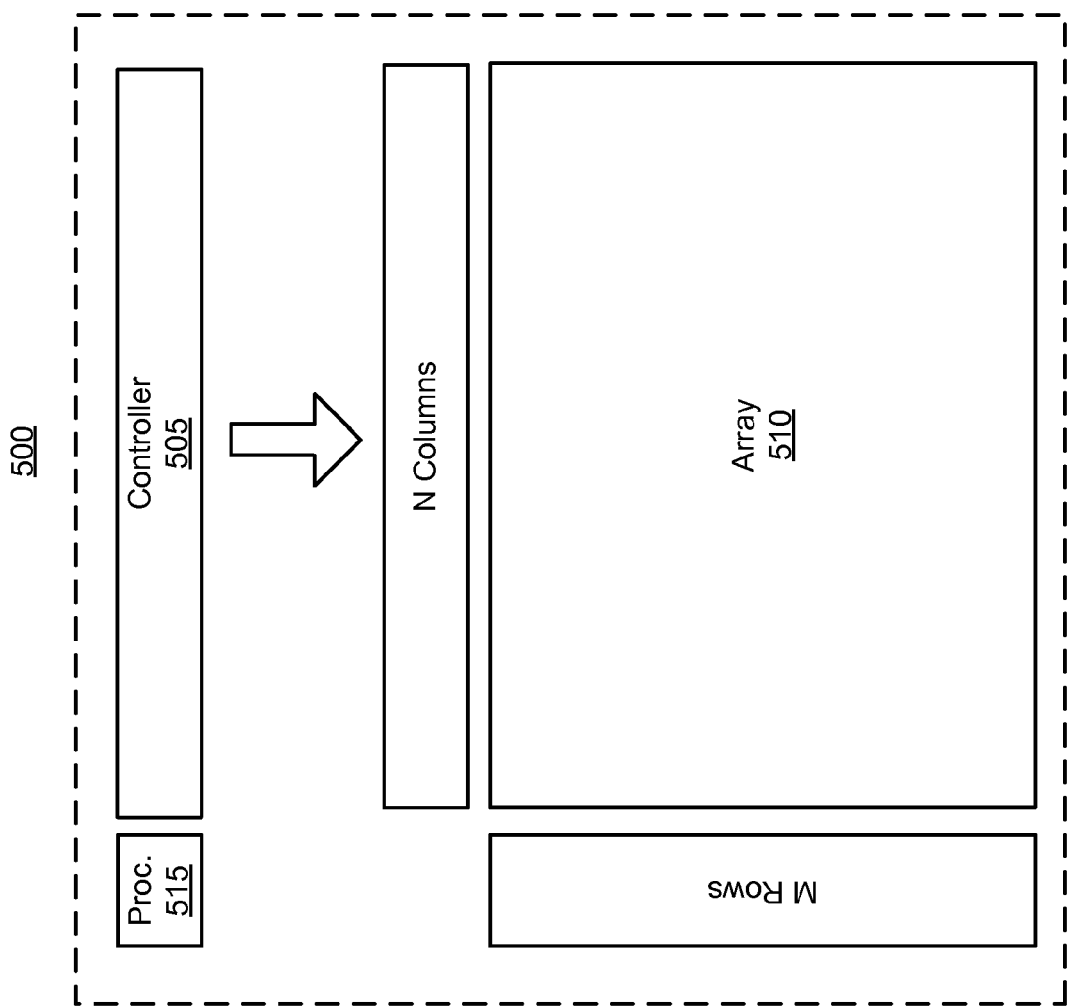
FIG. 5 is a block diagram illustrating an exemplary memory, according to one embodiment.

FIG. 5 illustrates a block diagram of a memory 500 that can be designed and fabricated using the process described in FIG. 4. In one embodiment, the memory 500 can be an integrated circuit that includes a memory array. In one embodiment, the memory 500 can implement the multi-segment SEC coding scheme described herein. The memory shown in FIG. 5 can be used as memory in a computing device. As shown in FIG. 5, the memory 500 includes an array 510. The array 510 includes a plurality of cells, where each cell can be used to store a bit of data. As shown in FIG. 5, the array 510 can be arranged in a grid that includes N columns and M rows of cells. The specific location of a particular cell can be referenced by its column and row numbers.

As further shown in FIG. 5, the memory 500 includes a controller 505. The controller 505 manages the operations of the array 510. For example, the controller 505 can receive read or write requests. Responsive to the requests, the controller 505 can operate the array 510 such that data can be read from or stored in the cells of the array 510. The processor 515 performs various operations that support the functionality of the memory 500.

In one embodiment, the memory can incorporate various memory scrambling techniques, such as IO cell scrambling, column scrambling, column twisting, a strap distribution, etc. In an embodiment, the memory 500 can additionally implement a multi-segment SEC coding scheme to detect and correct errors. The number of segments used by the multi-segment SEC coding scheme may be determined during the design and fabrication of the memory 500.

As described previously, the EDA software 412 determines a desirable number of segments for a multi-segment SEC coding scheme to be used in a memory designed via the process shown in FIG. 4. In one embodiment, the EDA software 412 receives a memory design specification input by, for example, a memory designer. The received specification information can describe the functionality and/or structure of the memory being designed. For example, the memory design specification can specify the number of words for a proposed memory, the number of bits in a data word, a column multiplexing ratio for the memory, a number of memory banks, etc.

In one embodiment, the specification information includes memory scrambling information. The memory scrambling information specifies the various ways the memory is to be scrambled. For example, the memory scrambling information can specify that the memory includes IO cell scrambling, column scrambling, column twisting, and/or a strap distribution. The memory scrambling information can additionally include various parameters, structures and other data needed to implement the various scrambling techniques.

Figure 6:
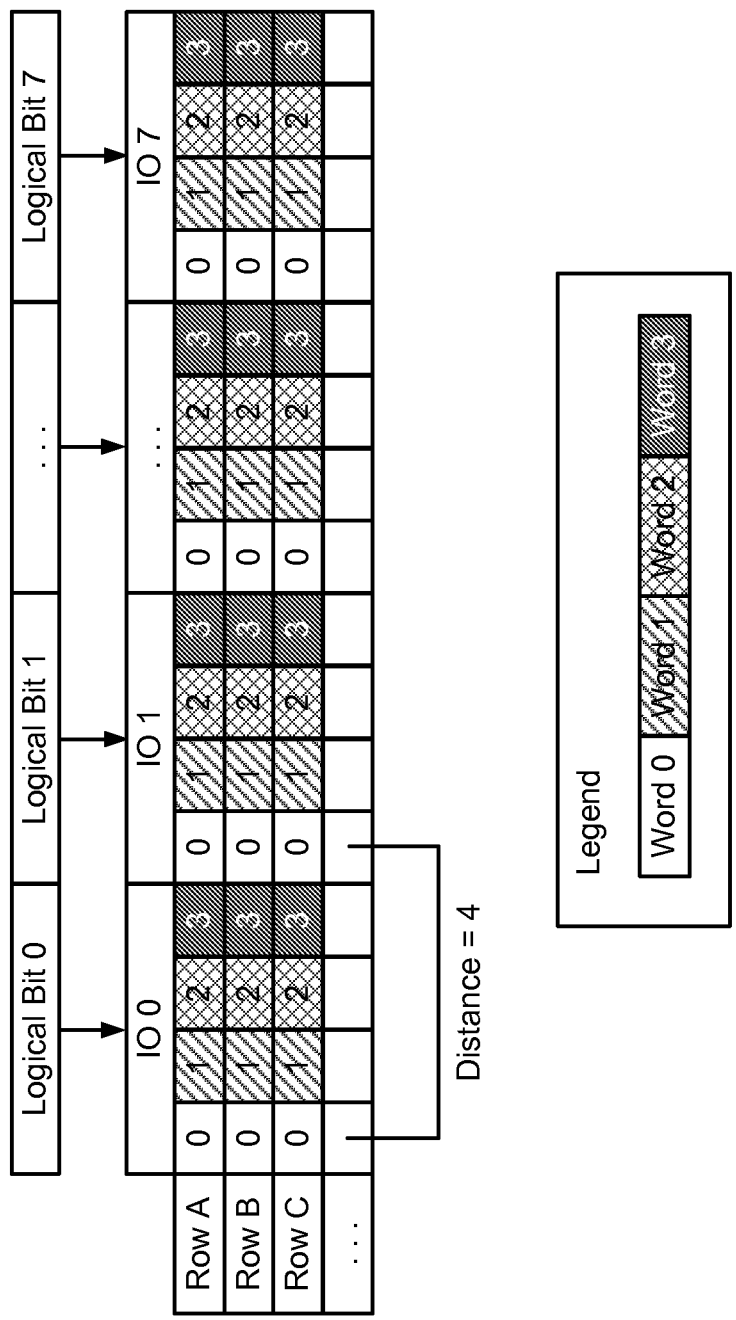
FIG. 6 illustrates a memory array without memory scrambling, according to one embodiment.

FIGS. 6 through 10 illustrate examples of various scrambling types that can be specified in the memory scrambling information received by the EDA software 414. In each of the FIGS. 6 through 10, an example memory array is shown. Each of the example memory arrays includes 32 columns and a multiplexing ratio of 4. More specifically, the 32 columns are divided into 8 column groups, where each group includes 4 columns. Each group of 4 columns is multiplexed by a particular IO cell. For example, referring to FIG. 6, the IO cell 0 multiplexes the first 4 columns of the memory array. Each IO cell is additionally mapped to a particular logical bit location. For example, as shown in FIG. 6, the cell 0 is mapped to the logical bit location 0. Each row of the example memory arrays is configured to store 4 different data words. Again referring to FIG. 6, row A stores the data word 0, data word 1, data word 2, and data word 3, where each data word includes 8 bits. As shown in FIG. 4, each bit of a data word is stored in a separate column group. For example, in FIG. 4, the first bit of word 0 is stored in the column group multiplexed by IO cell 0. The second bit of word 0 is stored in the column group multiplexed by IO cell 1, and so on.

In FIG. 6, an example memory array where scrambling has not been performed is illustrated. As shown in FIG. 6 the logical structure of the memory maps directly with the underlying physical structure of the memory. For example, the logical bit location 0 maps directly to the IO cell 0. In addition, each column group and row in the memory includes the same distribution. For example, the first cell of each of the 8 column groups includes a data bit related to the data word 0. The second cell of each of the 8 column groups includes a data bit related to the data word 1, and so on. Based on the distribution shown in FIG. 6, the distance between any 2 bits of the same data word is 4 cells.

Figure 7:
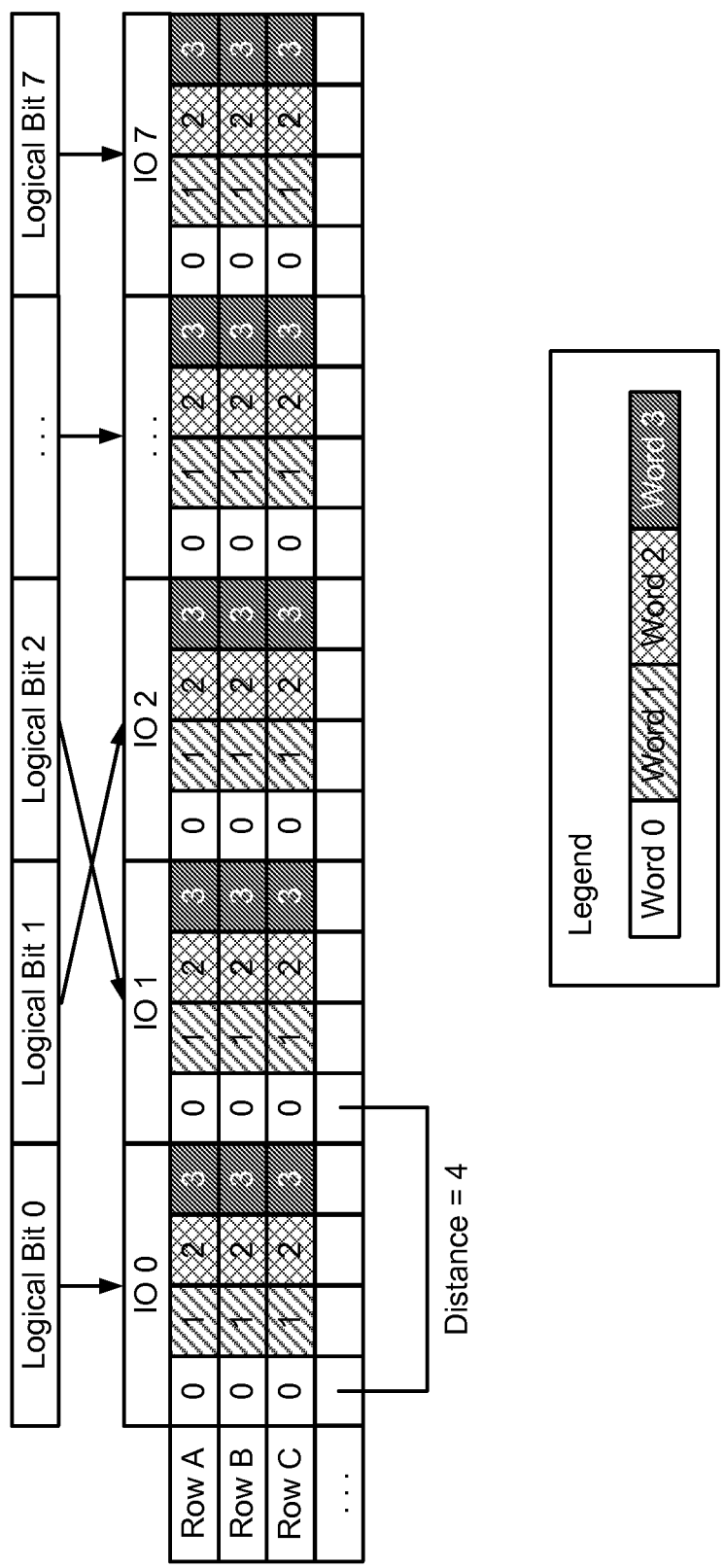
FIG. 7 illustrates a memory array that includes IO cell scrambling, according to one embodiment.

Referring now to FIG. 7, an example memory array that includes IO cell scrambling is illustrated. In IO cell scrambling, the mapping between the logical bit locations of a data word and the IO cells corresponding to the bit locations is scrambled. For example, in contrast to FIG. 6, the logical bit location 2 is shown in FIG. 7 as being mapped to the IO cell 1 rather than the IO cell 2. As a result, the 3rd bit of a data word would be stored in the column group multiplexed by the IO cell 1.

In one embodiment, the memory scrambling information relating to IO cell scrambling may include an IO cell mapping table. Each entry in the table may include a logical bit location of the memory and a corresponding IO cell. For example, an entry may indicate that logical bit location 0 corresponds to IO cell 2 of the memory.

Figure 8:
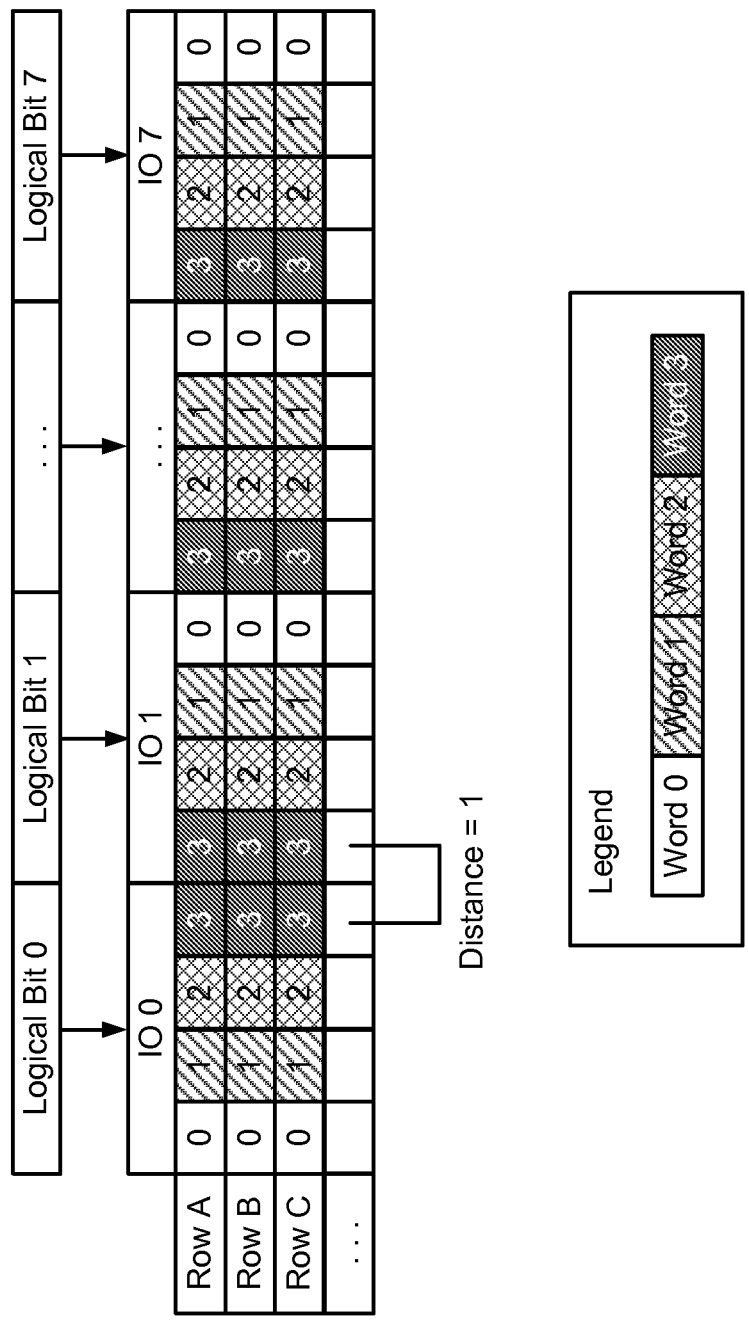
FIG. 8 illustrates a memory array that includes column scrambling, according to one embodiment.

Referring now to FIG. 8, an example memory array that includes column scrambling is shown. In column scrambling, each row contains an irregular column distribution. As used herein, a column distribution can refer to the specific assignments of columns to data words for a memory. As an example, referring to FIG. 6, the column distribution for row A would be denoted as 0123 0123 0123 0123 0123 0123 0123 0123. In the denotation, each position represents a column. The specific number in each position represents the data word to which the column is assigned. For example, the first column of row A of the memory array in FIG. 6 is assigned to the data word 0. The fifth column of row A of the memory array in FIG. 6 is also assigned to the data word 0.

In FIG. 6, a regular column distribution is shown (i.e. no column scrambling is implemented). In a regular column distribution, each column group includes the same column distribution. For example, in row A of FIG. 6, the first column is assigned to the data word 0, the second column is assigned to the data word 1, the third column is assigned to the data word 2, and the fourth column is assigned to the data word 3. The following columns thereafter follow the same distribution pattern.

FIG. 8, in contrast, illustrates a memory including column scrambling (i.e. where each row contains irregular column distributions). For example, in row A of FIG. 8, the first column is assigned to data word 0, the second column is assigned to data word 1, the third column is assigned to data word 2, and the fourth column is assigned to data word 3. However, in contrast to FIG. 6, the fifth column is assigned to data word 3, the sixth column is assigned to data word 2, the seventh column is assigned to data word 1, and the eighth column is assigned to data word 0.

In one embodiment, the memory scrambling information relating to column scrambling may include a column distribution table. Each entry in the table may include a particular column of the memory and a corresponding data word of the memory for the column. For example, an entry may indicate that column 0 of the memory corresponds to data word 2.

Figure 9A:
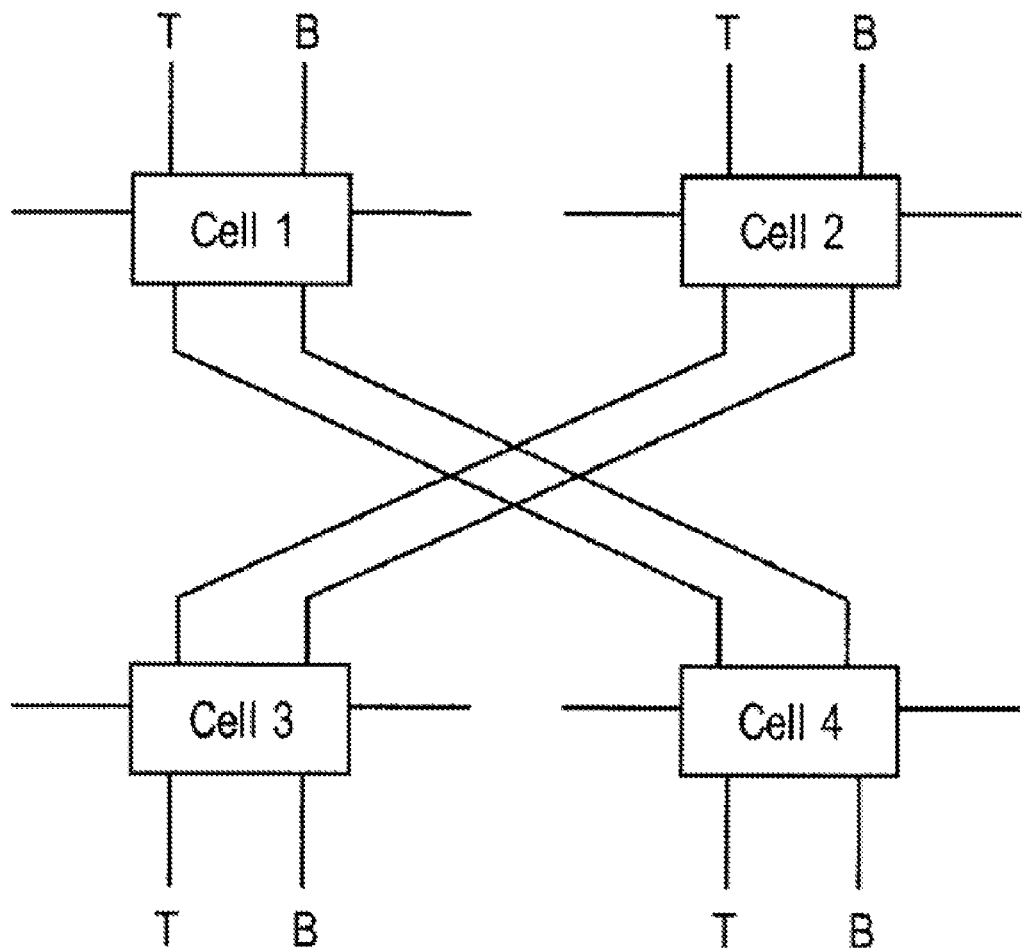
FIGS. 9A and 9B each illustrates a memory array that includes column twisting, according to one embodiment.
Figure 9B:
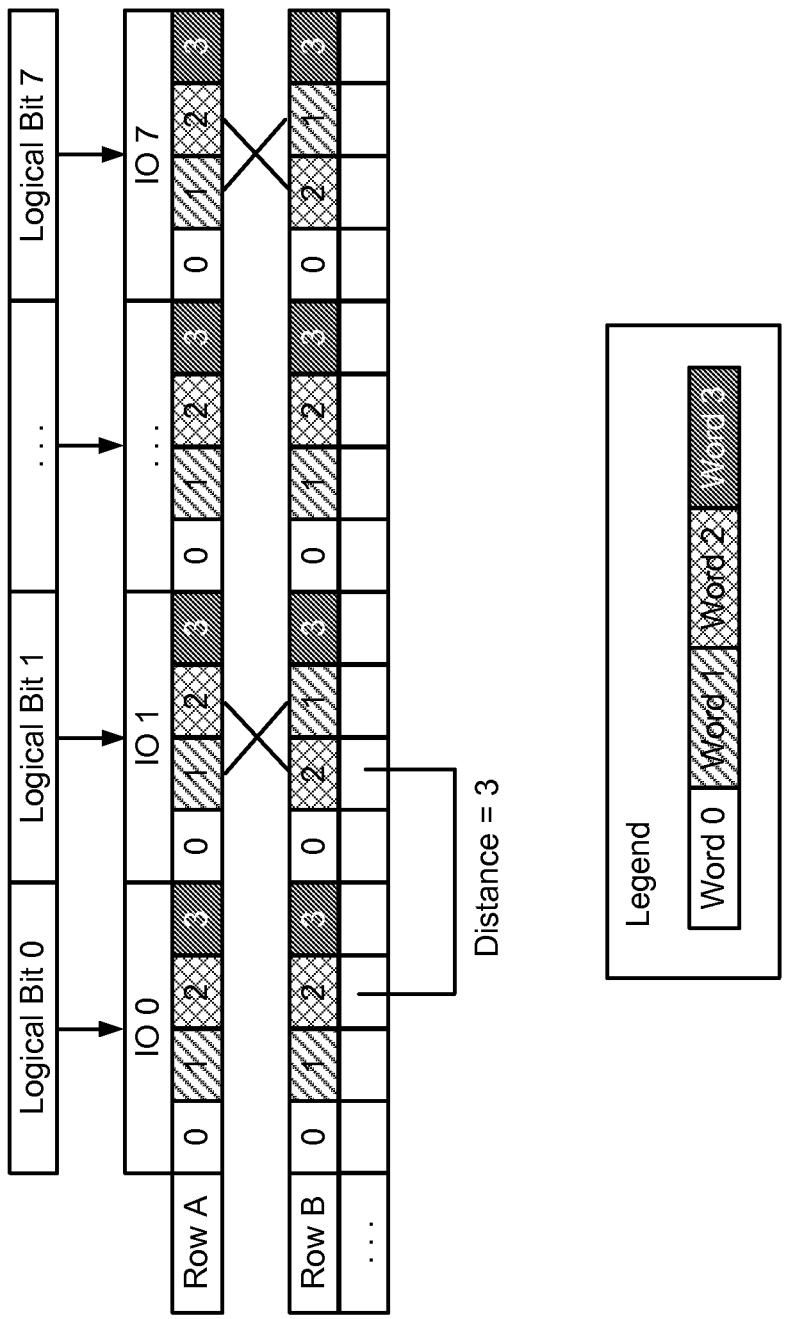

Referring to FIGS. 9A and 9B, an example memory including column twisting is shown. In column twisting, a pair of bitlines from one column of a memory array is twisted with the corresponding pair of bitlines from another column. For example, as shown in FIG. 9A, the cells 1 and 3 are in one column, and cells 2 and 4 are in a neighboring column. As shown in the figure, the bitline pairs (B and T) are twisted such that cells 1 and cells 4 are connected to the same pair of bitlines, and cells 2 and 3 are connected to the same pair of bitlines. As a result of this, the column distributions between different rows in the memory can differ. For example, as shown in FIG. 9B, the sixth and seventh columns of the memory array and the thirtieth and thirty-first columns are twisted such that row A contains a column distribution that is different from the column distribution of row B. Illustratively, the column group multiplexed by IO cell 1 includes a distribution of 0123 for row A and a distribution of 0213 for row B.

In one embodiment, the memory scrambling information relating to column twisting may include data specifying the bitlines that are twisted within the memory. For example, the information may indicate a specific bitline that has been twisted, the location of the twist, and the columns involved in the twist. Illustratively, the information may indicate that bitline 0 has been twisted, that the twist occurs between columns 0 and 1, and that the twist is located between row A and row B of the memory.

Figure 10:
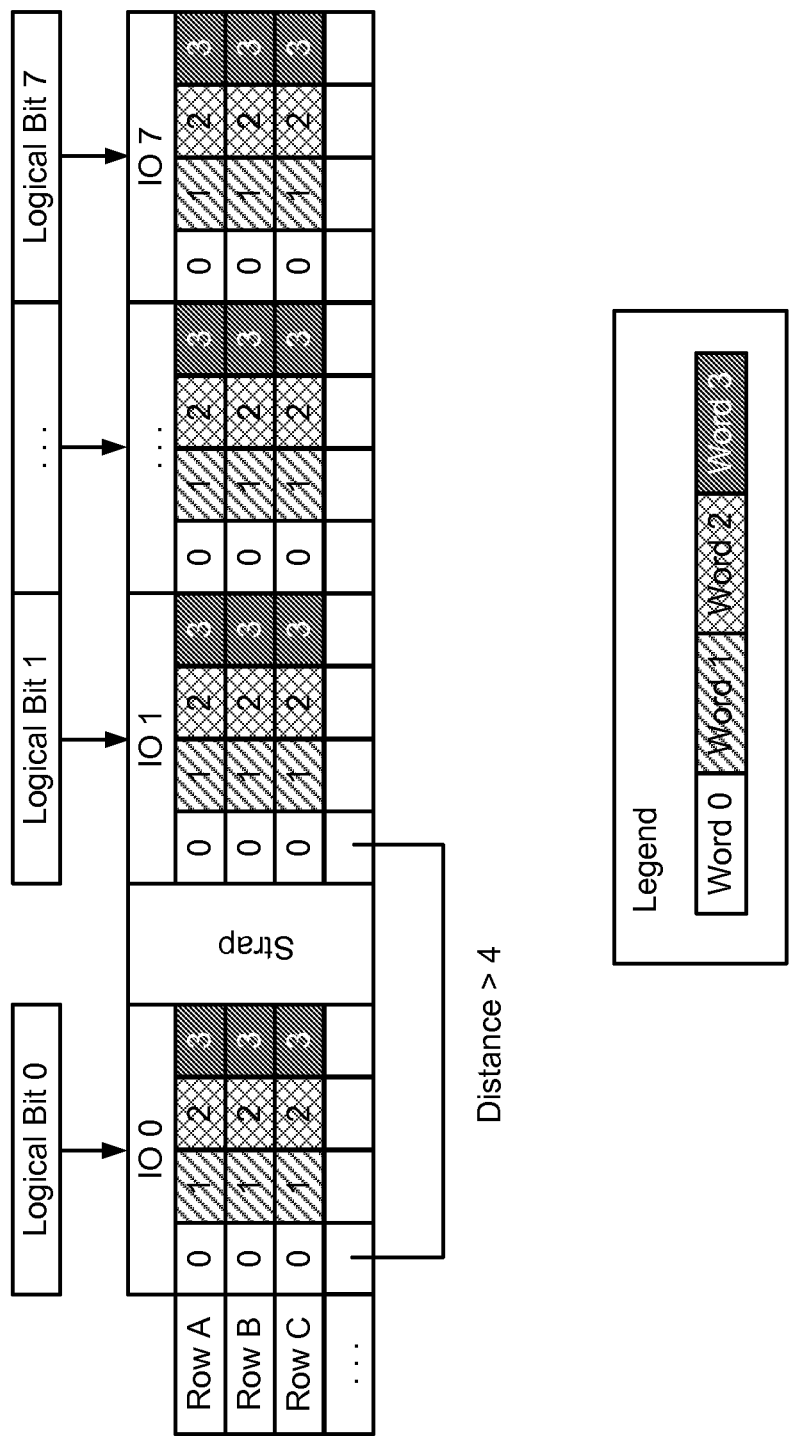
FIG. 10 illustrates a memory array that includes a strap distribution, according to one embodiment.

Referring to FIG. 10, an example memory array including a strap distribution configuration is shown. In a strap distribution configuration, memory cells are separated by a certain distance. If two neighboring cells have a strap of a substantial size between them, the two cells may not be affected by the same multi-bit upset. In such situations, the distance between the two cells may be considered infinite. In FIG. 10, for example, a strap separates the column groups multiplexed by the IO cell 0 and the IO cell 1. If the strap is of a sufficient size, it may be assumed that that an environmental event would not affect the cells in both column groups.

In one embodiment, the memory scrambling information relating to a strap distribution may include information identifying the straps in the memory, the size of each strap, the rows between which each strap is located, the columns between which each strap is located, etc.

As discussed, the EDA software 412 can use the memory scrambling information to determine a desirable number of segments for a multi-segment SEC coding scheme to be implemented by the memory. In one embodiment, the EDA software 412 can be configured to use information regarding any IO cell scrambling, column scrambling, column twisting, and/or strap distributions implemented in the memory in determining the desirable number of segments. More specifically, the EDA software 412 can use information regarding any IO cell scrambling, column scrambling, column twisting, and/or strap distributions in a memory to derive a mapping between the logical structure and physical layout for the memory. The mapping can be used to map the logical location for a bit to a physical location in the memory. In particular, the mapping can be used to identify a physical cell number that corresponds to a particular logical bit number, data word number, and row identifier combination. For example, a derived mapping may be stored in a mapping table. A particular entry in the table may include an entry specifying the logical bit location 0, row A, and the data word 0. The entry may additionally include a physical cell number or some other location identifier that corresponds to the logical bit location 0, row A, and the data word 0.

In one embodiment, the EDA software 412 calculates the distances between the bits of each data word of the memory. More specifically, for each pair of logically adjacent data bits in a data word, the EDA software 412 computes the physical distance between the 2 data bits. The computed distance can be based on the derived mapping and information regarding any straps used in the memory. For example, a first bit of a data word can be mapped to a physical location in the memory using the mapping. A second bit that is logically adjacent to the first bit can be mapped to another physical location in the memory using the mapping. Thereafter, the difference between the 2 physical locations can be computed. The distance between the 2 bits can be measured based on the computed difference and on information regarding the physical layout of the memory, including any incorporated straps. In one embodiment, upon calculating the physical distances, each of the distances can be stored in a table or other similar data structure.

In one embodiment, the EDA software 412 determines a minimum number of segments for a multi-segment SEC coding scheme to be implemented by the memory, where the determination is performed by referencing the table storing the physical distances between the bits of the memory. In one aspect, the minimum number of segments can satisfy a multi-bit upset size requirement and a masked write segmentation requirement received via the input of the designer.

In the embodiment, the EDA software 412 can select a segmentation value. The selected segmentation value can be equal to or greater than the received masked write segmentation requirement. The selected segmentation value can specify the number of times each data word stored in the memory is to be segmented. Upon selecting a segmentation value, the EDA software 412 generates a number of different segmentations for the memory. Each segmentation can divide the data words stored in the memory into a number of segments that is equal to the selected segmentation value. However, each segmentation may distribute the bits of the stored data words in a different manner.

For each segmentation, the EDA software 412 identifies a minimum or shortest distance between pairs of bits of the same segment. In particular, the process determines, for each pair of logically adjacent bits of the same segment, the physical distance between the bits. Such a distance can be determined by performing a lookup in the previously generated table storing the physical distances between the bits of the memory. Upon determining the distances between each pair bits of the same segment, the process identifies the minimum or shortest bit distance among the determined bit distances.

For each segmentation, the EDA software 412 determines whether the determined minimum distance for the segmentation is greater than or equal to the multi-bit upset size requirement. If the minimum distance for each segmentation is less than the multi-bit upset size, the EDA software 412 selects a new segmentation value. If the minimum distance for at least one segmentation is greater than or equal to the multi-bit upset size, then the EDA software 412 uses the segmentation value as the number of segments to be used for the multi-segment SEC coding scheme for the memory.

FIGS. 11 through 16 illustrate comparisons between a resulting data word segmentation generated by a conventional tool and a resulting data word segmentation generated by the EDA software 412. Each of the example memory arrays shown in FIGS. 11 through 16 includes 32 columns and a multiplexing ratio of 4. More specifically, each group of 4 columns is multiplexed by a particular IO cell. Each IO cell is additionally mapped to a particular logical bit location. Each row of the example memory arrays is configured to store 4 different 8-bit data words, where each bit of the data words is multiplexed by a particular 10 cell. For example, the first bits of the data words 0, 1, 2, and 3 are multiplexed by the IO cell 0. The bits of each data word are additionally divided into various segments. For example, as shown in FIG. 11, the bits corresponding to logical bit locations 1, 3, 5, and 7 that make up the data word 0 are included in a first segment and the bits corresponding to logical bit locations 2, 4, 6, and 8 of the data word 0 are included in a second segment.

FIG. 11 shows the segmentation of a memory array for a multi-segment SEC coding scheme, where memory scrambling is not used. In such a case, because the memory scrambling techniques described previously have not been used, a conventional tool and the EDA software 412 would generate the same segmentation. For purposes of discussion, it will be assumed that the multi-bit size requirement for the memory array shown in FIG. 11 is equal to a value of 5. As shown in the figure, because the multi-bit size requirement requires that any bit in the same segment be at least a distance of 5 cells away, the memory is segmented into 2 segments, with each segment having 4 bits of the original 8 bit data word. The data words in the memory must be segmented in this manner, because having a segmentation value of 1 would result in the distance between 2 bits in the same segment to be equal to 4, which would not satisfy the multi-bit size requirement. By segmenting the data word into 2 segments, the distance between any 2 bits of the same segment would be 8, which satisfies the multi-bit size requirement.

FIGS. 12A and 12B provide a comparison between the data word segmentation of a memory array generated by a conventional tool and by an embodiment, where the memory array incorporates IO cell scrambling. Referring to FIG. 12A, a memory array that includes a segmentation generated by a conventional tool is shown. As previously discussed, conventional tools do not consider memory scrambling information when determining the number of segments for a multi-segment SEC coding scheme. Rather, the data words of the memory array are segmented based primarily on the logical structure of the memory array. As shown in FIG. 12A, the memory is segmented into 2 segments. The bits corresponding to logical bit location 0, 2, 4, and 6 are included in one segment. The bits corresponding to logical bit location 1, 3, 5, and 7 are included in another segment. Segmenting the bits of a data word in this manner is known as simple interleaving and is the typical manner in which conventional tools segment a memory array. While segmenting the data words of a memory array using simple interleaving may be adequate for memory arrays that do not incorporate memory scrambling, using simple interleaving where memory scrambling is incorporated can lead to poor memory performance, storage efficiency, and/or error correction.

As shown in FIG. 12A, because IO cell scrambling is not considered, the actual locations of the bits in each segment are not sufficiently spaced apart as to satisfy the multi-bit upset size requirement of 5 cells. For example, as shown in FIG. 12A, the minimum distance between 2 bits of the same segment is only 4 cells. Because the bits in each segment are not sufficiently spaced, the memory array may routinely experience multi-bit upsets from which correction is not possible.

Referring to FIG. 12B, a memory array that includes a segmentation generated by an embodiment is shown. In particular, the resulting data segmentation considers the IO cell scrambling incorporated in the memory array. As a result, because the physical locations for each bit can be determined, the memory array is segmented such that the multi-bit size requirement is satisfied. In particular, the segmentation causes any 2 bits of the same data word to be spaced a distance of 8 cells apart, which satisfies the multi-bit upset size requirement of 5 cells. As a result, the memory array can operate properly without regularly experiencing uncorrectable multi-bit upsets.

FIGS. 13A and 13B provide a comparison between the data word segmentation of a memory array generated by a conventional tool and by an embodiment, where the memory array incorporates column scrambling. Referring to FIG. 13A, a memory array that includes a data word segmentation generated by a conventional tool is shown. For purposes of discussion in this example, assume that the multi-bit upset size requirement is equal to 4. In FIG. 13A, memory scrambling information is not considered, as a result the actual column distribution of the memory array is not known. As such, a conventional tool would assume that each row has a regular column distribution. More specifically, the conventional tool would assume that each of the 8 column groups would include a distribution pattern of 0123. As a result (because the multi-bit upset size is equal to 4), a conventional tool would incorrectly segment the memory array into 1 segment. In particular, a conventional tool would assume that because the distribution follows a pattern of 0123, that the bits of each data word would be separated by a distance of 4 cells. However, in reality, bits of the same data word may be distanced less than the multi-bit upset size requirement. For example, as shown in FIG. 13A, the distance between the first bit of the third word and the second bit of the third word would only be 1. As a result, uncorrectable multi-bit upsets may regularly occur in the memory array.

Referring to FIG. 13B, a memory array that includes a data word segmentation generated by an embodiment is shown. In particular, the resulting data segmentation considers the column scrambling incorporated in the memory. As a result, the distance between any 2 bits of the same segment is greater than the multi-bit upset size requirement of 4 cells.

FIGS. 14A and 14B provide a comparison between the data word segmentation of a memory array generated by a conventional tool and by an embodiment, where the memory array incorporates column twisting. Referring to FIG. 14A, a memory array that includes a data word segmentation generated by a conventional tool is shown. For purposes of discussion in this example, assume that the multi-bit upset size requirement is equal to 4. In FIG. 14A, because memory scrambling information is not considered, the column twisting incorporated into the memory array is not known. As a result, the conventional tool would assume that the memory array's physical structure appears similar to the structure shown in FIG. 11. As a result, the conventional tool would segment the data words in the memory array based on the structure. In particular, for a multi-bit upset size requirement of 4, the conventional tool would assume that a single segment would be sufficient. However, in segmenting the memory array in this manner, the minimum distance of the bits of a data word in row B would not be less than the multi bit-upset size requirement of 4. For example, as shown in FIG. 14A, the distance between the first bit of data word 2 of row B and the second bit of data word 2 of row B is a distance of 3. As a result, uncorrectable multi-bit upsets may regularly occur.

Referring to FIG. 14B, a memory array that includes a data word segmentation generated by an embodiment is shown. In particular, because information regarding the column twisting is known, data words in the memory array would be divided into 2 segments. As a result, any 2 bits within the same segment would be distanced greater than the multi-bit size of 4.

FIGS. 15A and 15B provide a comparison between the data word segmentation of a memory array generated by a conventional tool and the data word segmentation of a memory array generated by an embodiment, where the memory array incorporates a strap distribution. For purposes of discussion in this example, it will be assumed that the multi-bit upset size requirement is equal to 5 cells. In FIG. 15A, because memory scrambling information is not considered, the straps incorporated into the memory array are not known. As a result, a conventional tool would assume that the memory array's physical structure appears similar to the structure shown in FIG. 11. As a result, the conventional tool would segment the data words in the memory array based on such a structure. In particular, for a multi-bit size requirement of 5, the conventional tool would require the data words of the memory array to be divided into 2 segments. However, as shown in FIG. 15A, the memory array includes straps between each of the column groups. As a result, the distance between any 2 bits within the same word may be larger than or equal to the multi-bit upset size requirement of 5 even without segmentation. By not accounting for the straps, a conventional tool would divide the data words of the memory array into more segments than is necessary, which would impact memory performance and storage efficiency.

Referring to FIG. 15B, a memory array that includes a data word segmentation generated by an embodiment is shown. In particular, because information regarding the strap distribution is known, it can be determined that the straps would sufficiently distance any 2 bits within the same data word to satisfy the multi-bit upset size requirement. As a result, the data words in the memory array would be divided into a single segment. In doing so, the memory array can avoid multi-bit upsets while being able to maintain a performance level and storage efficiency that is better as compared to memory arrays segmented using conventional tools.

It should be appreciated that while the disclosure primarily describes using information regarding IO scrambling, column scrambling, column twisting, and strap distributions to determine a desirable number of segments for a multi-segment SEC coding scheme, other types of scrambling techniques can also be used. For example, embodiments can use information regarding: address scrambling, bank scrambling, memory bitline twisting and minoring, I/O bitline twisting, I/O bitline mirroring, row scrambling, I/O column twist, wordline twist, port scrambling, metal layer scrambling, power line distribution among bitlines, power line distribution among wordlines, redundancy distribution, repair scrambling, etc. Additional details regarding the different techniques for memory scrambling that can be described in memory scrambling information and used to determine a desirable number of segments for a multi-segment SEC coding scheme are set forth in U.S. Pat. No. 7,768,840, which is incorporated by reference herein.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein and that various modifications, changes and variations may be made in the arrangement, operation and details of the method and apparatus disclosed herein without departing from the spirit and scope as defined in the appended claims.

What is claimed is:

1. A computer-implemented method for selecting a minimum number of segments for a multi-segment single error correcting (SEC) coding scheme, the method comprising:
   determining, based on memory scrambling information, a mapping between a logical structure for a representation of a memory and a physical layout for the representation, the memory scrambling information including information specifying one or more memory scrambling techniques implemented in the representation to store a data word;
   determining a plurality of distances based on the determined mapping, wherein each distance is determined for a pair of storage locations of the representation;
   receiving a masked write segmentation requirement and a multi-bit upset size requirement;
   selecting a segmentation value greater than or equal to the masked write segmentation requirement;
   dividing one or more data words of the representation into a plurality of segments corresponding to the segmentation value;
   determining a set of distances for pairs of bits of the one or more segments;
   determining whether a shortest distance in the set of distances is greater than the multi-bit upset size; and
   selecting the segmentation value for the representation with the one or more memory scrambling techniques implemented for the data word to be greater than or equal to the masked write segmentation requirement based on determining that the shortest distance is greater than the multi-bit upset size.

2. The computer-implemented method of claim 1, wherein the memory scrambling information includes information for at least one of the following memory scrambling techniques: Input-Output (IO) cell scrambling, column scrambling, column twisting, and a strap distribution.

3. A computer-implemented method for selecting a desirable number of segments for a multi-segment single error correcting (SEC) coding scheme, the method comprising:
   receiving memory scrambling information for a representation of a memory, the memory scrambling information including information specifying one or more memory scrambling techniques implemented in the representation to store a data word;
   determining a plurality of distances based on the memory scrambling information, wherein determining each distance in the plurality is based at least in part on a pair of storage locations of the representation;
   receiving a multi-bit upset size requirement; and
   selecting a number of segments for the representation with the one or more memory scrambling techniques implemented for the data word to be greater than or equal to a masked write segmentation requirement based on the plurality of distances and the multi-bit upset size requirement.

4. The computer-implemented method of claim 3, wherein the representation includes an array defined by a set of columns and a set of rows, and wherein the memory scrambling information includes information regarding a column distribution for the representation.

5. The computer-implemented method of claim 3, wherein the memory scrambling information includes a mapping between a set of logical bit locations and a set of Input-Output (IO) cells of the representation.

6. The computer-implemented method of claim 3, wherein the memory scrambling information includes dimensions for a strap included in the representation.

7. The computer-implemented method of claim 3, wherein the memory scrambling information includes information regarding the twisting of one or more pairs of bitlines of the representation.

8. The computer-implemented method of claim 3, wherein determining the plurality of distances includes referencing a mapping between a logical structure of the representation and a physical layout for the representation, wherein the mapping is generated using the received memory scrambling information.

9. The computer-implemented method of claim 8, wherein the mapping is usable for identifying a physical storage location of the representation that corresponds to a logical bit location of the representation.

10. The computer-implemented method of claim 8, wherein determining each distance in the plurality includes determining a difference between a first storage location for a first bit and a second storage location for a second bit, wherein the first storage location and the second storage location are determined based on the mapping.

11. A non-transitory machine-readable storage medium storing machine-executable program code, the program code comprising program code for:
   receiving memory scrambling information for a representation of a memory, the memory scrambling information including information specifying one or more memory scrambling techniques implemented in the representation to store a data word;
   determining a plurality of distances based on the memory scrambling information, wherein determining each distance in the plurality is based at least in part on a pair of storage locations of the representation;
   receiving a multi-bit upset size requirement; and
   selecting a number of segments for the representation with the one or more memory scrambling techniques implemented for the data word to be greater than or equal to a masked write segmentation requirement based on the plurality of distances and the multi-bit upset size requirement.

12. The non-transitory machine-readable storage medium of claim 11, wherein the representation includes an array defined by a set of columns and a set of rows, and wherein the memory scrambling information includes information regarding a column distribution for the representation.

13. The non-transitory machine-readable storage medium of claim 11, wherein the memory scrambling information includes a mapping between a set of logical bit locations and a set of Input-Output (IO) cells of the representation.

14. The non-transitory machine-readable storage medium of claim 11, wherein the memory scrambling information includes dimensions for a strap included in the representation.

15. The non-transitory machine-readable storage medium of claim 11, wherein the memory scrambling information includes information regarding the twisting of one or more pairs of bitlines of the representation.

16. The non-transitory machine-readable storage medium of claim 11, wherein determining the plurality of distances includes referencing a mapping between a logical structure of the representation and a physical layout for the representation, wherein the mapping is generated using the received memory scrambling information.

17. An integrated circuit fabricated from a representation of the integrated circuit, the representation comprising:
   a memory array for storing a plurality of bits; and
   a controller coupled to the memory array, the controller configured to perform a multi-segment SEC coding scheme using a set of segments, wherein a number of segments in the set segments is determined by:
      receiving memory scrambling information for a representation of a memory, the memory scrambling information including information specifying one or more memory scrambling techniques implemented in the representation to store a data word;
      determining a plurality of distances based on the memory scrambling information, wherein determining each distance in the plurality is based at least in part on a pair of storage locations of the representation;
      receiving a multi-bit upset size requirement; and
      selecting a number of segments for the representation with the one or more memory scrambling techniques implemented for the data word to be greater than or equal to a masked write segmentation requirement.

18. The integrated circuit of claim 17, wherein the memory scrambling information includes information for at least one of the following memory scrambling techniques: IO cell scrambling, column scrambling, column twisting, and a strap distribution.

19. The integrated circuit of claim 17, wherein determining the plurality of distances includes referencing a mapping between a logical structure of the representation and a physical layout for the representation, wherein the mapping is generated using the received memory scrambling information.

* * * * *